(12) United States Patent
Engelhardt et al.

(10) Patent No.: US 11,984,775 B2
(45) Date of Patent: May 14, 2024

(54) STATOR OF AN ELECTRIC DRIVE MACHINE AND METHOD FOR PRODUCING SAME

(71) Applicant: Dr. Ing. h.c. F. Porsche Aktiengesellschaft, Stuttgart (DE)

(72) Inventors: Tobias Engelhardt, Stuttgart (DE); Stefan Oechslen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 34 days.

(21) Appl. No.: 17/751,678

(22) Filed: May 24, 2022

(65) Prior Publication Data

US 2022/0385152 A1 Dec. 1, 2022

(30) Foreign Application Priority Data

May 27, 2021 (DE) ...................... 10 2021 113 691.1

(51) Int. Cl.
*H02K 15/02* (2006.01)
*H02K 1/16* (2006.01)
(Continued)

(52) U.S. Cl.
CPC ............ *H02K 15/024* (2013.01); *H02K 1/16* (2013.01); *H02K 3/345* (2013.01); *H02K 15/10* (2013.01)

(58) Field of Classification Search
CPC ............ H02K 1/16; H02K 1/165; H02K 3/34; H02K 3/345; H02K 15/024; H02K 15/10
(Continued)

(56) References Cited

U.S. PATENT DOCUMENTS 10,673,306 B2   6/2020   Handa et al.
11,482,900 B2   10/2022  Almeida E Silva et al.
(Continued)

FOREIGN PATENT DOCUMENTS

DE   102010055821 B4   9/2014
DE   102016101705 A1   8/2017
(Continued)

OTHER PUBLICATIONS

Juergen Hagedorn, "Einführung in die Spulenkörper", Handbuch der Wickeltechnik für hocheffiziente Spulen und Motorn: ein Beitrag zur Energieeffizienz, Dec. 2016, pp. 41-53, Springer, Berlin, Germany.

*Primary Examiner* — Rashad H Johnson
(74) *Attorney, Agent, or Firm* — LEYDIG, VOIT & MAYER, LTD.

(57) ABSTRACT

A method for producing a stator includes: providing a main body, the main body having: a cavity for accommodating a rotor, and a plurality of slots, extending axially through the main body, the plurality of slots accommodating electrical conductors of a winding, providing slot insulation so as to ensure that a slot interior of each slot of the plurality of slots is electrically insulated from the main body and is fluidtight; and forming a respective end plate on each of two ends of the main body, the end plates being attached in a fluidtight manner to the main body so as to ensure that no fluid can get between the end plate and the main body and reach the cavity of the main body. Each end plate has a radial part and an axial part, and the axial part has an insert.

11 Claims, 3 Drawing Sheets

(51) Int. Cl.
*H02K 3/34* (2006.01)
*H02K 15/10* (2006.01)

(58) Field of Classification Search
USPC .................................................. 310/179, 181
See application file for complete search history.

(56) References Cited

U.S. PATENT DOCUMENTS

| | | | | |
|---|---|---|---|---|
| 2002/0047480 | A1* | 4/2002 | Heim | H02K 3/50 |
| | | | | 310/43 |
| 2002/0089244 | A1* | 7/2002 | Liang | H02K 9/223 |
| | | | | 310/64 |
| 2002/0130573 | A1 | 9/2002 | Kikuchi et al. | |
| 2009/0273254 | A1* | 11/2009 | Heim | H02K 15/12 |
| | | | | 310/195 |
| 2010/0019589 | A1 | 1/2010 | Saban et al. | |
| 2012/0007453 | A1* | 1/2012 | Leiber | H02K 1/20 |
| | | | | 310/43 |
| 2013/0270931 | A1* | 10/2013 | Handa | H02K 5/10 |
| | | | | 310/43 |
| 2015/0035406 | A1 | 2/2015 | Huang et al. | |
| 2016/0172920 | A1 | 6/2016 | Li et al. | |
| 2017/0047803 | A1* | 2/2017 | Scherer | H02K 3/34 |
| 2018/0226855 | A1 | 8/2018 | Berendes et al. | |
| 2020/0007000 | A1 | 1/2020 | Berendes et al. | |
| 2020/0136445 | A1* | 4/2020 | Hoerz | H02K 9/227 |
| 2020/0156296 | A1* | 5/2020 | E Silva | H02K 15/10 |
| 2020/0161916 | A1* | 5/2020 | E Silva | H02K 3/24 |
| 2020/0161917 | A1* | 5/2020 | E Silva | H02K 9/197 |
| 2020/0161918 | A1* | 5/2020 | Almeida E Silva | H02K 1/165 |
| 2020/0161947 | A1* | 5/2020 | Almeida E Silva | H02K 15/105 |
| 2020/0185993 | A1* | 6/2020 | Hoerz | H02K 1/20 |
| 2020/0295614 | A1* | 9/2020 | Cunningham | H02K 3/345 |
| 2020/0295615 | A1* | 9/2020 | Cunningham | H02K 3/24 |
| 2020/0295617 | A1* | 9/2020 | Cunningham | H02K 3/24 |
| 2020/0295618 | A1* | 9/2020 | Cunningham | H02K 3/34 |
| 2021/0036568 | A1* | 2/2021 | Schulz | H02K 3/12 |
| 2021/0328472 | A1* | 10/2021 | Diehl | H02K 3/24 |
| 2021/0351668 | A1* | 11/2021 | Leiber | H02K 9/223 |
| 2022/0014062 | A1* | 1/2022 | Almeida E Silva | H02K 9/227 |
| 2022/0021259 | A1* | 1/2022 | Almeida E Silva | H02K 9/19 |
| 2022/0320933 | A1* | 10/2022 | El-Refaie | B33Y 80/00 |
| 2022/0337126 | A1* | 10/2022 | Könen | H02K 1/20 |
| 2022/0385127 | A1* | 12/2022 | Engelhardt | H02K 15/12 |
| 2022/0393538 | A1* | 12/2022 | Engelhardt | H02K 1/165 |
| 2023/0050563 | A1* | 2/2023 | Homann | H02K 16/04 |
| 2023/0054794 | A1* | 2/2023 | Fatemi | H02K 3/345 |

FOREIGN PATENT DOCUMENTS

| | | |
|---|---|---|
| DE | 102017102141 A1 | 8/2018 |
| DE | 102018115927 A1 | 1/2020 |
| DE | 102019120824 A1 | 2/2021 |
| JP | S 57-168976 U | 10/1982 |
| JP | 2003009437 A | 1/2003 |
| JP | 2016116443 A | 6/2016 |
| JP | 2020089260 A | 6/2020 |
| WO | WO 2012086227 A1 | 6/2012 |

* cited by examiner

STATOR OF AN ELECTRIC DRIVE MACHINE AND METHOD FOR PRODUCING SAME

CROSS-REFERENCE TO PRIOR APPLICATION

Priority is claimed to German Patent Application No. DE 10 2021 113 691.1, filed on May 27, 2021, the entire disclosure of which is hereby incorporated by reference herein.

FIELD

The present invention relates to a stator of an electric drive machine and to a method for producing same, which can be used with a stator inserted therein, in particular for driving a hybrid or electric vehicle.

BACKGROUND

With the steadily increasing number of electric vehicles, there are now sometimes also commercially available high-performance electric vehicles which even surpass the best sports cars, traditionally driven by an internal combustion engine, in terms of their driving performance Electric motors with liquid cooling are used in the correspondingly agile and high-torque drives, which make available a continuous high power. By means of liquid cooling, the power loss arising in the form of heat at the stator winding can be efficiently dissipated. For this purpose, the housing of the electric machine contains a cooling channel system, through which a liquid coolant flows. The heat produced in the electric motor is dissipated into the coolant by heat conduction and convection. In a coolant cooler, the absorbed heat is released to the environment, as a result of which the coolant is cooled down again and fed back to the housing of the electric machine in a closed circuit.

In a large number of electric machines, the winding overhangs are the power-limiting component, a winding overhang being understood to mean that part of a winding or flat-wire winding which is located outside the stator slots since they are those parts of the electric machine which reach the maximum permissible or tolerable temperature during operation. For this reason, the aim of the cooling system is to make the heat transfer between the winding overhang and the coolant as good as possible. The winding overhangs are therefore frequently impregnated with casting compound. Furthermore, there are concepts in which oil flows directly around the winding overhangs. The oil replaces the conventional coolant. In this case, it must be ensured that the oil does not get into the air gap between the stator and the rotor since this then leads to high frictional losses. To achieve this, the stator space in these concepts is often sealed by a sleeve produced from a non-magnetizable material, from fiber-reinforced plastic for instance. However, lining the stator space has the disadvantage that the "magnetic air gap" between the stator and the rotor becomes larger, thereby reducing the efficiency and the maximum possible torque of the electric machine. This can be counteracted by embodying the sleeve in such a way that it has a high strength and rigidity with a low wall thickness. Examples of this can be found in DE 10 2010 055 821 B4 and DE 10 2016 101 705 A1.

In order to dissipate the heat loss even more efficiently, electric machines with direct winding cooling are known from the prior art, in which the cooling medium is guided directly through the slots in which the winding wires are located. The cooling medium thus flows completely around the copper windings, making a larger surface area available for heat transfer and making it possible to dissipate the waste heat better.

Direct winding cooling is known in German Patent Application DE 10 2017 102 141, for example. To implement direct winding cooling, the component which seals the stator space is laminated directly into the stator, pressed on in situ and cured with the application of heat. By virtue of the force-locking and partly also form-locking (adhesive) connection, the "liner" can withstand high pressures in the stator space during operation. The liner and the laminated stator core are inseparably connected to one another. Lamination enables a comparatively inexpensive material to be used and small wall thicknesses of the liner to be achieved, for example by means of glass-fiber-reinforced plastic (GRP). As an alternative to this, an inherently stable sleeve can be produced, for example in a winding process. The sleeve is manufactured and cured separately from the stator and can be inserted axially into the stator at any time during the stator manufacturing process. In this case, it forms a part which can be separated from the laminated stator core and can be removed, e.g. in the event of repair, and can be replaced if appropriate. Since the sleeve does not enter into a connection with the laminated stator core, it must be produced from a stiffer and stronger material in order to be able to withstand the external pressure of the cooling fluid in the stator space during operation. Carbon fibers or Zylon fibers, for example, can therefore be used in this case. In addition, the wall thickness of the sleeve must generally be greater than the wall thickness of a liner. For stabilization, the sleeve must be thickened locally, in particular under the winding overhangs, where it is "free-standing" and is exposed to the pressure of the cooling fluid without support by a part of the laminated stator core. Here, stabilization is carried out in such a way that the rotor can still be introduced axially into the electric machine. That is to say that the thickening must be provided radially inward on one side and radially outward on the other side.

SUMMARY

In an embodiment, the present invention provides a method for producing a stator, comprising: providing a main body, the main body comprising: a cavity for accommodating a rotor, and a plurality of slots, extending axially through the main body, the plurality of slots being configured to accommodate electrical conductors of a winding, providing slot insulation so as to ensure that a slot interior of each slot of the plurality of slots is electrically insulated from the main body and is fluidtight; and forming a respective end plate on each of two ends of the main body, the end plates being attached in a fluidtight manner to the main body so as to ensure that no fluid can get between the end plate and the main body and reach the cavity of the main body, wherein each end plate has a radial part and an axial part, and the axial part has an insert.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In an embodiment, the present invention provides a stator in which a flow space for the cooling fluid which leads through the stator slots and thus around the winding conductors or wires is provided in a low-cost and reliable manner, ensuring that the cooling fluid cannot get into the rotor space and thus into the air gap between the rotor and the stator.

The production method according to the invention and the stator which can be produced accordingly therewith are based on the approach of providing the stator, with slot insulation which is already designed to be fluidtight, in each case on the end with an end plate which is connected in a fluidtight manner to the slot insulation and the surrounding stator housing and which has an insert for increasing the load-bearing capacity or the structural component strength.

The axial part of the end plate is loaded by the hydraulic pressure of the cooling fluid and should be embodied in a correspondingly stable manner. However, the maximum possible wall thickness of the axial part is limited by the surrounding components. Thus, the inside diameter of the winding overhang determines the maximum outside diameter of the axial part, and the outside diameter of the rotor determines the minimum inside diameter of the axial part. Consequently, depending on the working pressure of the cooling fluid flowing through the cooling channels, the load-bearing capacity of the axial part may be critical. The invention provides an aid for this purpose and is advantageous, in particular, if the mechanical properties of the material of the end plate (without the insert) are not sufficient to produce an end plate which is sufficiently narrow/thin in its axial region that this can withstand the hydraulic pressure of the cooling fluid during operation of the electric machine. Looked at in a different way, the method according to the invention makes it possible to use a low-cost, readily processable material for the end plate, for example short-fiber-reinforced plastic, thus enabling the required component strength to be compensated for or 'made up' by the insert.

According to the invention, a method for producing a stator is provided. The method comprises providing a main body of the stator, which has a cavity for accommodating a rotor, and a plurality of slots, extending axially through the main body, for accommodating a winding. The main body can preferably comprise a laminated core. The stator produced according to the invention may be a stator with direct cooling of the stator winding.

The method further comprises providing slot insulation, thus ensuring that each slot interior is electrically insulated from the main body and is fluidtight. The slot insulators can be formed in one piece in each slot, and can be fluidtight and made from an electrically and preferably magnetically non-conductive material which has a high dielectric strength. Plastics can usually be used for this purpose, for example Nomex-Kapton-Nomex (NKN), although this is not fluidtight, or a polyether ether ketone polymer (PEEK), which is both fluidtight and electrically insulating. In general, the slot insulators can be injected directly or manufactured separately and inserted/placed into the slots.

The method further comprises forming a respective end plate on each of the two ends of the main body, wherein the end plates are attached in a fluidtight manner to the main body, thus ensuring that no fluid can get between the end plate and the main body and reach the cavity of the main body or stator. Furthermore, the end plates have a radial part and an axial part, wherein the axial part has an insert. The insert is a structure-reinforcing insert which gives the axial part of the end plate more component strength than its production from the material of the radial part of the end plate. The insert can extend over the entire axial extent of the axial part of the end plate or over a part thereof. For example, the insert may be a structurally stable hollow cylinder, in particular a structurally more stable hollow cylinder in comparison with an identical hollow cylinder which is produced from the material of the end plate, which forms part of or corresponds to the axial part of the end plate. Consequently, the insert can be regarded as a "corset" which reinforces the axial part of the end plate.

Formation of the end plates can be understood as meaning both actual formation in the sense of basic production of the end plates from a material, for example by injection molding, and formation in the sense of fastening or attachment of already prefabricated end plates or end plate parts to the stator, which is carried out as part of the method according to the invention. In the latter case, the axial part and the radial part can be fastened or attached to the main body separately from one another. For example, the axial part of the end plate can represent a separate component and can be attached downstream in a fluidtight manner to the radial part of the end plate, which is first fastened in a fluidtight manner to the main body.

The end plates are attached in a fluidtight manner to the main body, thus ensuring that no fluid can get radially between the end plate and the main body and thus into the air gap between the stator and the rotor inserted into the latter. Since the electrical conductors of the stator winding rest against the end plates, the end plates are likewise produced from an electrical insulator, for example plastic, if appropriate fiber-reinforced. The end plates have an axial and a radial region or an axial and a radial part, wherein the axial part extends along (but offset parallel to) the longitudinal axis of the stator and the radial part extends correspondingly perpendicular thereto. Thus, the axial part of the end plate may be geometrically substantially a hollow cylinder, the openings of which are arranged parallel to the openings of the stator space. The radial part of the end plate may be geometrically substantially a circular disk with a concentric opening, which is arranged parallel to the openings of the stator space. The slot insulators are connected in a fluidtight manner to the respective end plate, in particular its radial part, at the ends of the main body. The connection can be accomplished by welding and/or adhesive bonding if the components comprise thermoplastics. Furthermore, the end plates can be "molded onto" the slot insulators in the manufacturing process, that is to say can be integrally molded onto the slot insulators by means of injection molding.

The axial part of the end plates is sealed off from the stator housing by a seal. This seal can rest radially and/or axially against the end plate and against the stator housing. The fluidtight axial attachment of the end plates to the laminated core can be accomplished, for example, by molding them onto the end of the main body, by separate manufacture and adhesive bonding (locally as a ring or over the entire surface, for example with an annular adhesive mat) or by separate manufacture in conjunction with a conventional seal (O-ring, gasket, etc.).

The fluidtight embodiment of the slot insulators and the fluidtight attachment thereof to the end plates gives rise to a flow space in the region of the winding overhangs and within the slots, which flow space is fluidtight with respect to the rotor space. An electrically nonconductive fluid flows through said space in order to dissipate the heat loss which arises at the winding. The boundary of the flow region is predetermined in the winding overhang region by the housing and the end plate. In the region of the slots, the flow region is delimited by the slot insulation. In this way, the cooling fluid can flow almost completely around the winding, which can thus be cooled in an ideal manner.

In a further step, the method according to the invention can comprise inserting conductors (e.g. copper conductors) into the slots of the main body. These are then brought into electrical contact with one another in accordance with the desired circuit pattern and form the stator winding.

It should be pointed out that the method according to the invention, with the exception of the feature that the axial part of the end plate has the insert, can be carried out to German Patent Application DE10 2017 102 141 A1.

According to further embodiments of the method according to the invention, the step of forming the end plate may comprise producing the end plate by at least partially overmolding material fibers with a material of the end plate, wherein the overmolded material fibers form the insert, and fluidtightly attaching a respective end plate to each of the two ends of the main body. In this case, the insert can comprise pure fibers, for example glass fibers, carbon fibers, aramid fibers, etc. During the overmolding process, the fibers are simultaneously impregnated.

According to further embodiments of the method according to the invention, the step of forming the end plate may comprise producing the end plate by overmolding the insert with a material of the end plate, wherein the insert comprises a fiber-reinforced plastic composite, and attaching a respective end plate in a fluidtight manner to each of the two ends of the main body. In this case, the insert can be in the form of a separately produced part and can comprise a fiber-reinforced plastic composite, for example. The overmolding of the insert with the end plate material can comprise partial overmolding (for example molding on) or complete overmolding. Furthermore, the at least partial overmolding of the insert can take place directly on the stator, as a result of which the end plate in its entirety or at least the axial part thereof is molded onto the main body at the same time.

According to further embodiments of the method according to the invention, a surface of the insert can correspond to a surface of the end plate. In other words, the insert does not have to be completely overmolded with the end plate material but can also be molded on during the production of the corresponding stator or end plate, such that one of its surfaces is at least partially exposed. In one exemplary embodiment, the insert can lie radially on the inside, that is to say can form an end plate surface which faces the interior of the stator. This can be advantageous, in particular, if the insert can be embodied with or has a very good surface on the inside. In a further exemplary embodiment, the insert can lie radially on the outside, that is to say can form a surface facing away from the interior of the stator or, in other words, an end plate surface facing the part of the cooling channels which lies in the region of the winding overhang. This may be advantageous, in particular, when the surface of the insert is of relatively low quality. By selecting one of the exemplary embodiments, it is possible to ensure that the radial sealing surface is of high surface quality and the sealing effect can be reliably ensured. Depending on the specific configuration of the stator, one or the other embodiment may be advantageous. A good or poor quality of the surface can be understood to refer to its suitability in respect of one of the methods explained above for attaching the end plate to the slot insulators and/or the main body.

In addition, the properties of the materials involved, that is to say of the material of the end plate and of the material of the insert, can be appropriately exploited. It is important that the insert and the end plate material do not lift off from each other during operation. If, for example, a high temperature is present during manufacture and the insert has a higher thermal expansion than the end plate material, the insert can rest radially on the outside against the axial part of the end plate since it is then always "shrunk" onto the end plate material or bulges toward the end plate material. If, on the other hand, the insert is located radially on the inside and there is a high temperature during manufacture, the thermal expansion of the insert may accordingly be preferentially less than the thermal expansion of the end plate material.

According to further embodiments of the method, the step of forming the end plate may comprise attaching the radial part of the end plate in a fluidtight manner to the corresponding end of the main body and attaching the insert in a fluidtight manner to the radial part of the end plate. In this embodiment, the insert corresponds to the axial part of the end plate and is manufactured separately. For this purpose, the fibers impregnated with synthetic resin can be wound onto a mandrel and cured, for example. After the radial part of the end plate has been attached in a fluidtight manner to the end of the main body in accordance with one of the methods already described, the separately manufactured insert can then be connected in a fluidtight manner to the radial part of the end plate, for example by means of adhesive bonding or welding. In further exemplary embodiments, it is additionally possible to form a radially encircling joint in the radial part of the end plate, into which joint the insert is inserted by one of its ends and can be adhesively bonded or welded in this position, by which means the insert can be given even better retention when it is attached to the radial part.

According to the invention, a stator of an electric drive machine is furthermore provided, which can be produced, in particular, by means of the method according to the invention described above. The stator according to the invention described below can thus have all the structural-spatial features described in connection with the production method according to the invention or structural-spatial features corresponding to the functional features of the production method and vice versa.

The stator according to the invention has a main body which preferably corresponds to a laminated stator core, with a cavity for accommodating a rotor and with a plurality of slots, extending axially through the main body, for accommodating a winding, the interior of which is electrically insulated from the main body and is fluidtight. A respective end plate is formed on each end of the stator, being attached in a fluidtight manner to the main body, thus ensuring that no fluid can get between the end plate and the main body and reach the cavity of the main body. The end plate has a radial part and an axial part, and, as already described above, the axial part has the insert.

According to further embodiments of the stator, the insert can comprise material fibers overmolded with the material of the end plate. In this case, the material fibers are simultaneously impregnated by the material of the insert.

According to further embodiments of the stator, the insert can comprise a fiber-reinforced plastic composite. In this case, the insert can be in the form of a thin hollow cylinder and be completely embedded in the axial part of the end plate, for example overmolded, or it can be only partially overmolded. In general, the insert can be arranged or attached exclusively on or in the axial part of the end plate or alternatively can project into the radial part. It is the latter case if the insert projects into a region of the end plate which is delimited by a continuation of the two surfaces of the radial part of the end plate in the radially outer region, that is to say toward the outside of the stator, into the radially inner region, that is to say toward the interior of the stator. The choice of the arrangement of the insert can be adapted to the individual case, taking into account geometric dimensions and coefficients of thermal expansion of the materials, to name two examples of possible determination parameters.

According to further embodiments of the stator, a surface of the insert can correspond to a surface of the end plate. In other words, a surface of the insert is then exposed since the insert is not completely surrounded by the material of the end plate. In this case, the insert can rest radially on the outside or radially on the inside against the axial part of the end plate.

According to further embodiments of the stator, the insert can correspond to the axial part of the end plate. In other words, the insert can form the axial part of the end plate and can be connected in a fluidtight manner to the main body, on the one hand, and to the radial part of the end plate, on the other hand.

According to various embodiments, the stator according to the invention is provided with a high-performance direct cooling system which comprises a plurality of cooling channels, wherein each cooling channel extends through a slot of the stator and has a fluid inlet and a fluid outlet, which are each arranged in the region of the winding overhang. The stator according to the invention can thus be used for producing an electric machine with direct cooling of the winding. The cooling fluid is guided exactly where the significant losses occur. In addition, inexpensive materials and manufacturing methods can be used. The production costs are considerably lower than in the direct cooling variants with a liner or can. The stator according to the invention offers high robustness in manufacture and in operation. It should furthermore be emphasized that any desired assembly method can be used for the assembly of the laminated stator core since the laminated stator core itself does not have to be leaktight and does not have to carry any components on its axial length. The laminated core can, for example, be welded or punch-assembled. These methods are considerably less expensive than, for example, assembly by means of baked enamel. The stator according to the invention can take place with or without additional sealing in the air gap. Additional sealing in the air gap is selected in order to provide additional assurance that no fluid can get into the rotor space and thus into the air gap. In embodiments without additional sealing in the air gap, there is no component there. Consequently, the air gap selected can be very small, leading to higher performance and higher efficiencies of the machine.

Within the scope of the production method according to the invention and with the stator according to the invention, a considerable increase in load-bearing capacity is achieved by higher robustness and the associated lower risk of failure of the electric machine and by the possibility of using higher pressures in the cooling fluid system. This results in greater flexibility in respect of the cooling fluids used, which, in particular, can have a higher viscosity. Moreover, the volumetric flows can be increased and thus the amount of heat dissipated can be increased. In addition, a very good surface can be achieved in the sealing region. This is necessary and helpful in order to be able to reliably mount the seals and to be able to reliably ensure the leaktightness of the electric machine in all operating ranges and over its service life.

It is self-evident that the features mentioned above and those that will be explained below can be used not only in the respectively specified combination but also in other combinations or on their own without departing from the scope of the present invention.

Further advantages and embodiments of the invention will become apparent from the description as a whole and from the accompanying drawings.

Figure 1:
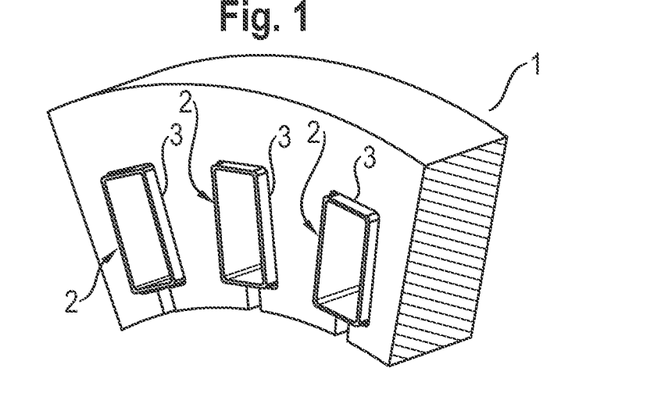
FIG. 1 shows a perspective view of part of a stator according to the invention with inserted slot insulation.
Figure 2:
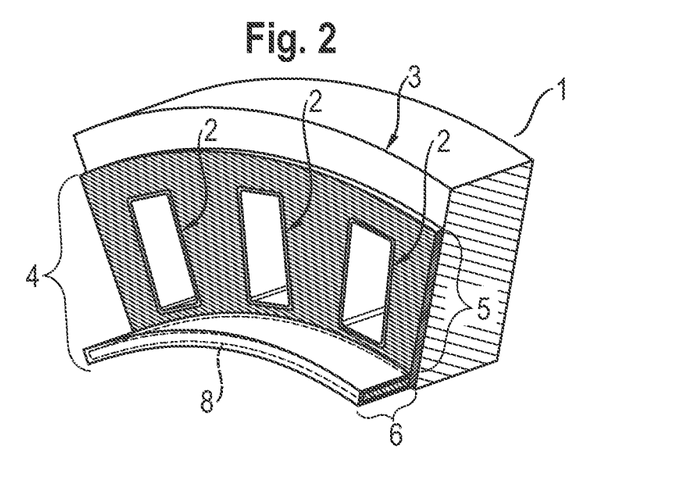
FIG. 2 shows a perspective view of part of a stator according to the invention with inserted slot insulation and an end plate.
Figure 3:
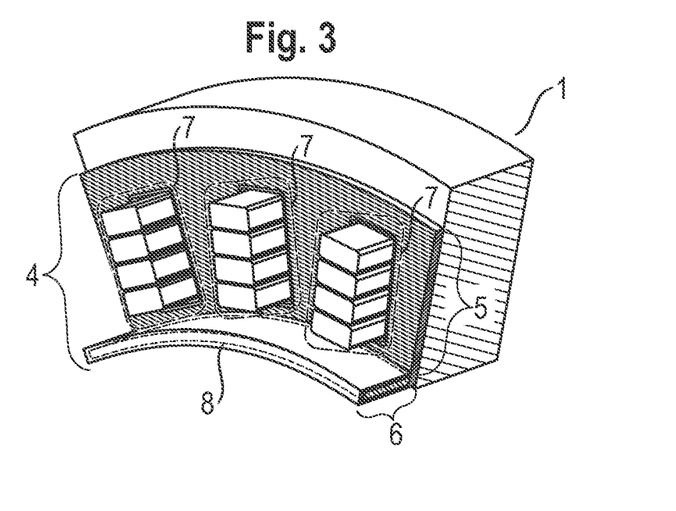
FIG. 3 shows a perspective view of part of a stator according to the invention with inserted slot insulation, end plate and electrical conductors of the stator winding which have been inserted into the slots.

FIGS. 1-3 show perspective views of part of a stator according to the invention. The different views illustrate different phases of the production method according to the invention. In a first step, which precedes the state of the stator shown in FIG. 1, the main body 1 of the stator is provided, wherein the main body 1 has a cavity for accommodating a rotor and a plurality of slots 2, extending axially through the main body 1, for accommodating a winding. In a subsequent step, the method according to the invention comprises providing slot insulation 3, thus ensuring that each slot interior is electrically insulated from the main body 1 and is fluidtight. The state of the stator in this phase of the production method according to the invention is illustrated in FIG. 1. The slot insulators 3 can be molded into the stator slots 2 or inserted into them as finished sleeves.

In a subsequent step of the method according to the invention, which is illustrated in FIG. 2, a respective end plate 4 is arranged on each of the two ends of the main body 1, wherein each end plate 4 is attached in a fluidtight manner to the main body 1, ensuring that no fluid can get between the end plate 4 and the main body 1 and reach the cavity of the stator. Here, the end plate 4 has a radial part 5 and an axial part 6, and the axial part 6 has an insert 8. As shown in FIG. 2, the radial part 5 extends in a sheet-like manner on the end of the main body 5, in a plane which is perpendicular to the axial extent or longitudinal axis of the main body 1. The axial part 6 extends in a sheet-like manner over the entire circumference, parallel to the axial extent or parallel to the longitudinal axis of the main body 1. The insert 8 is shown in dashed lines since, in the example shown, it is completely embedded within the axial part 6 of the end plate 4. The state of the stator shown in FIG. 2 can be achieved by, for example, placing the insert 8 against the end of the main body 1 and overmolding it with the material of the end plate 4. At the same time, the end plate 4 is molded onto the end of the main body 1 and the slot insulators 3 are connected in a fluidtight manner to the end plate 5 (for example by welding or adhesive bonding). Alternatively, the insert 8 can be inserted in the axial part 6 of the end plate 4 and overmolded with the material of the end plate 4. This separately manufactured end plate 4 is then attached in a fluidtight manner to the end of the main body 1 and connected in a fluidtight manner to the slot insulators 3.

Finally, FIG. 3 illustrates an optional step of the production method according to the invention, in which the electrical conductors 7 of a winding—in the example shown these are copper conductors of "plug-in" coils (hairpin coils)—have been inserted into the slots 2, whereupon the winding of the electrical machine can be produced.

Figure 4A:
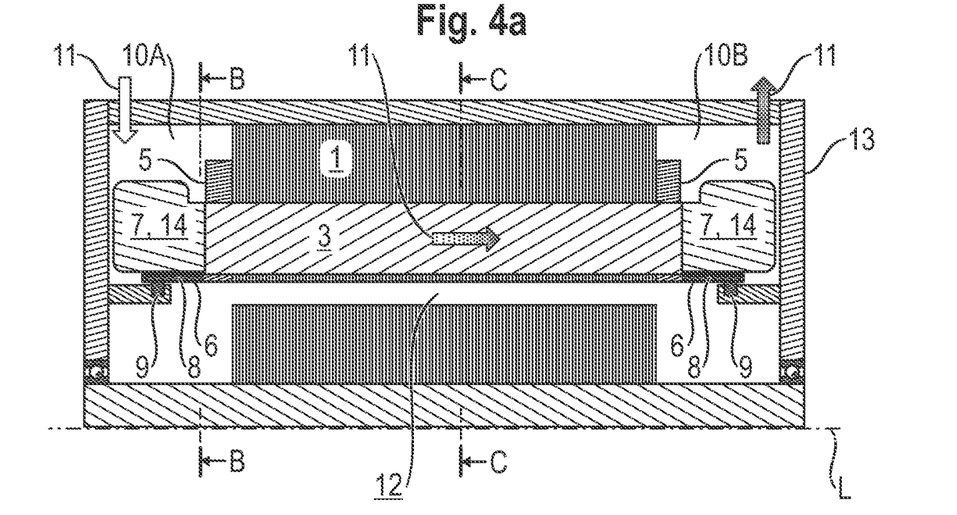
FIG. 4A shows a cross-sectional view of part of the stator according to the invention along its longitudinal axis.
Figure 4B:
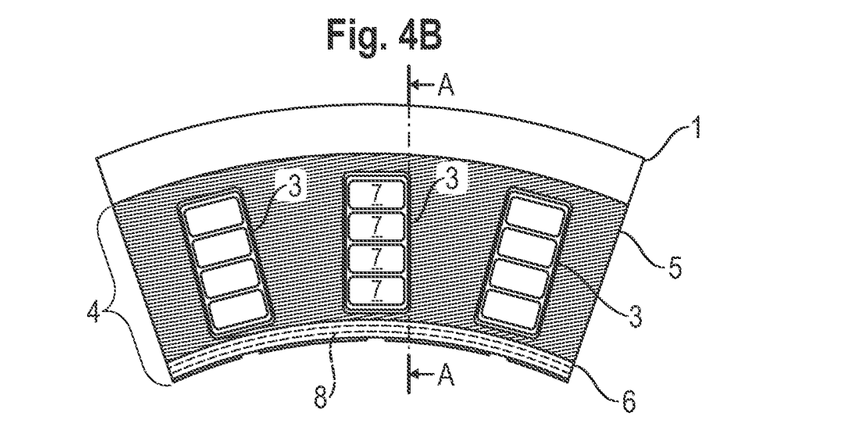
FIG. 4B shows a cross-sectional view of the part of the stator according to the invention shown in FIG. 4A perpendicular to its longitudinal axis, in the radial section B-B.
Figure 4C:
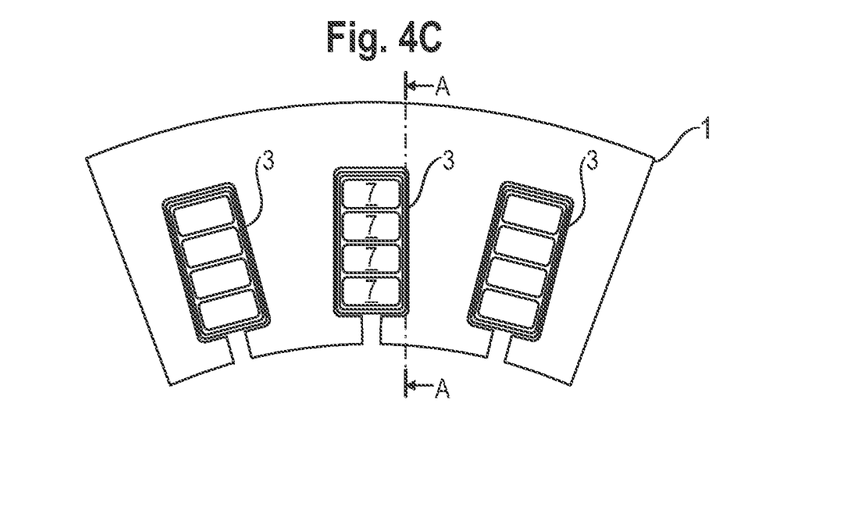
FIG. 4C shows a cross-sectional view of the part of the stator according to the invention shown in FIG. 4A perpendicular to its longitudinal axis, in the radial section C-C.

FIG. 4A shows a cross-sectional view of part of an illustrative stator according to the invention along its longitudinal axis L. Correspondingly, FIGS. 4B, 4C show cross-sectional views of the part of the stator according to the invention shown in FIG. 4A, perpendicular to the view shown in FIG. 4A, in the radial section B-B or C-C, both of which are indicated in FIG. 4A.

In order to provide direct cooling of the winding, a flow space around the electrical conductors 7 is formed in the stator, which space comprises a first chamber 10A, a second chamber 10B and the intervening interior of the corresponding slot 2, which is not occupied by the electrical conductors 7. The latter corresponds to the intermediate spaces between the electrical conductors 7 within the slots 2, which can be seen particularly well in FIGS. 4B and 4C. Here, the first chamber 10A and the second chamber 10B each comprise a winding overhang 14 of the winding. A possible fluid flow, which is provided by means of a pump during operation of an electric machine constructed on the basis of the stator according to the invention, is indicated by arrows 11, the direction of flow being, of course, chosen arbitrarily. The flow space is designed to be fluidtight with respect to the cavity 12 or rotor space for accommodating the rotor, ensuring that the cooling fluid cannot get into the rotor space and thus into the air gap between the rotor and the stator.

The end plates, each of which has a radial part 5 and an axial part 6, are attached in a fluidtight manner to the main body 1 of the stator (for example by welding, adhesive bonding or molding on of the material of the end plate 5), ensuring that no fluid can get radially between the end plate 4 and the main body 1 and thus into the air gap, which, in FIG. 4A, corresponds to the uppermost part of the cavity 12. The axial part 6 of the end plates 4 is sealed off from the housing 13 of the stator by a seal 9. In the example shown, the seal rests radially against the end plate 4, in particular against its axial part 6 and the housing 13. Additionally or alternatively, the seal 9 can generally rest axially against the end plate and against the housing 13.

In the exemplary embodiment of the stator according to the invention shown in FIG. 4A, the axial part 6 of the end plate 4 has the insert 8 to increase its structural strength. The insert 8 is molded in in the axial part 6 of the end plate 4. As already described, the insert 8 can comprise pure fibers (glass fibers, carbon fibers, aramid fibers, etc.) which have been impregnated with the material of the end plate 4 during the overmolding process. Alternatively, the insert 8 can comprise a fiber-reinforced plastic composite which is overmolded with the end plate material. In the exemplary embodiment shown in FIG. 4A, the insert 8 is located (preferably completely) exclusively in the axial part 6 of the end plate 4.

Figure 5:
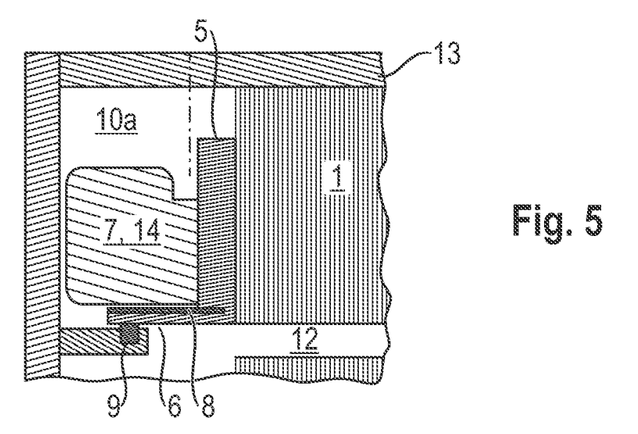
FIG. 5 shows a cross-sectional view of an exemplary embodiment of an end of the stator according to the invention.
Figure 6:
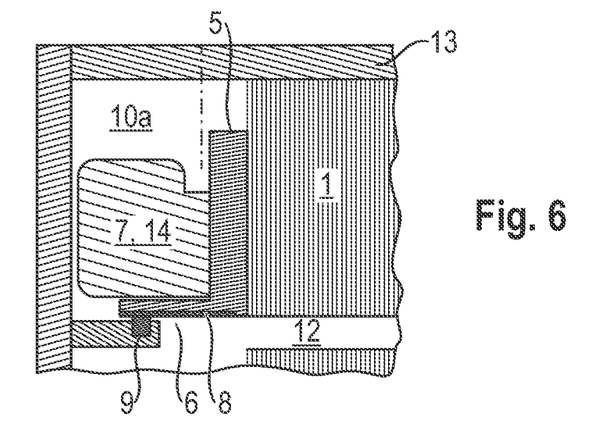
FIG. 6 shows a cross-sectional view of another exemplary embodiment of an end of the stator according to the invention.
Figure 7:
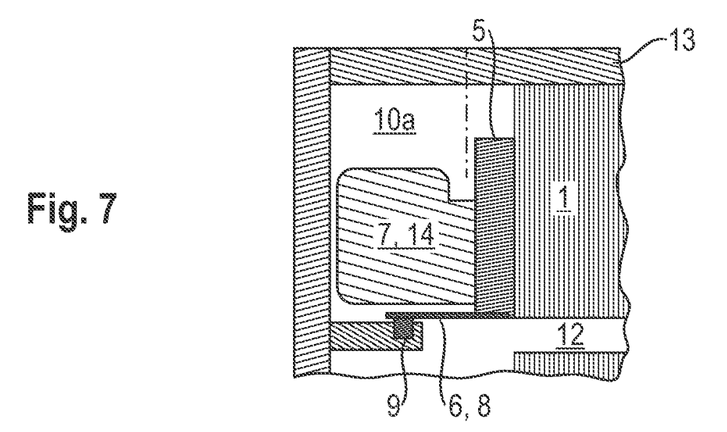
FIG. 7 shows a cross-sectional view of another exemplary embodiment of an end of the stator according to the invention.

FIGS. 5-7 show cross-sectional views of further exemplary embodiments of an end of the stator according to the invention. Since the views in FIGS. 5-7 are contained in broad outline as partial views in FIG. 4A, identical elements are provided with the same reference signs and are not described again in detail.

The stators according to the invention which are illustrated in FIGS. 5 and 6 differ from the stator shown in FIG. 4A in that, on the one hand, the insert 8 projects into the radial part 5 of the end plate 4. For the sake of completeness, it should be pointed out that, analogously to the exemplary embodiment shown in FIG. 4A, the insert 8 can also extend into the radial part 5 of the end plate 4. Furthermore, in FIGS. 5 and 6, the insert 8 is not completely overmolded with the end plate material, but only "molded on". As a result, a surface of the insert 8 corresponds to a surface of the end plate 4, more precisely to a surface of the axial part 6 of the end plate 4. In FIG. 5, the insert 8 is arranged radially on the inside on the axial part 6 and, in FIG. 6, the reverse case is shown, in which the insert 8 is arranged radially on the outside on the axial part 6 of the end plate 4. The terms "radially on the outside" and "radially on the inside" relate to the radial position relative to the longitudinal axis L of the stator and of the rotor space 12.

FIG. 7 shows a cross-sectional view of another embodiment of an end of the stator according to the invention. Here, the axial part 6 of the end plate 4 corresponds to the insert 8, and therefore the axial part 6 has no material of the end plate 4. For this purpose, the insert 8 can be manufactured separately and connected in a fluidtight manner in one of the ways already described to the radial part 5 of the end plate 4, which part has been previously attached to the end of the main body 1 (for example by adhesive bonding or welding).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for producing a stator, comprising:
   providing a main body, the main body comprising:
   a cavity for accommodating a rotor, and
   a plurality of slots, extending axially through the main body, the plurality of slots being configured to accommodate electrical conductors of a winding,
   providing slot insulation so as to ensure that a slot interior of each slot of the plurality of slots is electrically insulated from the main body and is fluidtight; and
   forming a respective end plate on each of two ends of the main body comprising producing the end plate by at least partially overmolding material fibers with a material of the end plate, the end plates being attached in a fluidtight manner to the main body so as to ensure that no fluid can get between the end plate and the main body and reach the cavity of the main body,
   wherein each end plate has a radial part and an axial part, and the axial part has an insert.

2. The method of claim 1, wherein the overmolded material fibers form the insert, and wherein forming the respective end plate comprises:
   attaching the respective end plate to each of the two ends of the main body.

3. The method of claim 1, wherein forming the respective end plate comprises:
   producing the end plate by overmolding the insert with the material of the end plate, the insert comprising a fiber-reinforced plastic composite; and
   attaching the respective end plate to each of the two ends of the main body.

4. The method of claim 1, wherein a surface of the insert corresponds to a surface of the end plate.

5. The method of claim 1, wherein forming the respective end plate comprises:
   attaching the radial part of the end plate to the corresponding end of the main body; and
   attaching the insert to the radial part of the end plate.

6. The method of claim 1, wherein producing the end plate by at least partially overmolding material fibers with a material of the end plate further comprises:
   placing the insert against the end of the main body such that the insert projects farther away from the main body in an axial direction than in a radial direction; and
   at least partially overmolding the insert with the material of the end plate.

7. The method of claim 1, wherein producing the end plate by at least partially overmolding material fibers with a material of the end plate further comprises:
   inserting the insert into the axial part of the end plate, wherein the axial part projects farther away from the main body in an axial direction than in a radial direction; and
   overmolding the insert with the material of the end plate.

8. A stator of an electric drive machine, comprising:
   a main body with a cavity configured to accommodate a rotor; and
   a plurality of slots, extending axially through the main body, configured to accommodate electrical conductors of a winding, an interior of which is electrically insulated from the main body and is fluidtight,
   wherein a respective end plate is formed on each end of the stator and is attached in a fluidtight manner to the main body so as to ensure that no fluid can get between the end plate and the main body and reach the cavity of the main body,
   wherein the end plate has a radial part and an axial part, and the axial part has an insert, and
   wherein the insert comprises material fibers at least partially overmolded with a material of the end plate.

9. The stator of claim 8, wherein the insert comprises a fiber-reinforced plastic composite.

10. The stator of claim 8, wherein a surface of the insert corresponds to a surface of the end plate.

11. The stator of claim 8, wherein the insert corresponds to the axial part of the end plate.

* * * * *